United States Patent
Pichler et al.

(10) Patent No.: US 11,536,517 B2
(45) Date of Patent: Dec. 27, 2022

(54) METHOD FOR PRODUCING A HEAT PIPE

(71) Applicant: Miba Sinter Austria GmbH, Laakirchen (AT)

(72) Inventors: Philipp Pichler, Thalheim bei Wels (AT); Franz-Josef Gielesberger, Ohlsdorf (AT)

(73) Assignee: Miba Sinter Austria GmbH, Laakirchen (AT)

(*) Notice: Subject to any disclaimer, the term of this patent is extended or adjusted under 35 U.S.C. 154(b) by 77 days.

(21) Appl. No.: 17/163,653

(22) Filed: Feb. 1, 2021

(65) Prior Publication Data

US 2021/0247146 A1  Aug. 12, 2021

(30) Foreign Application Priority Data

Feb. 12, 2020  (AT) .............................. A 50106/2020

(51) Int. Cl.
*B23P 15/26* (2006.01)
*F28D 15/04* (2006.01)

(52) U.S. Cl.
CPC .............. *F28D 15/04* (2013.01); *B23P 15/26* (2013.01); *B23P 2700/09* (2013.01); *Y10T 29/49353* (2015.01)

(58) Field of Classification Search
CPC ........................... B23P 15/26; Y10T 29/49353
See application file for complete search history.

(56) References Cited

U.S. PATENT DOCUMENTS

| 3,869,300 | A | * | 3/1975 | Scheiber | ............. B29C 63/0069 |
| | | | | | 427/195 |
| 4,490,411 | A | * | 12/1984 | Feder | ...................... C23C 24/10 |
| | | | | | 427/233 |
| 6,303,191 | B1 | | 10/2001 | Henne et al. | |
| 11,118,844 | B2 | * | 9/2021 | Shin | ..................... F28D 15/046 |
| 2007/0095506 | A1 | | 5/2007 | Hou et al. | |
| 2014/0099440 | A1 | * | 4/2014 | Hamilton | ................. G21C 3/20 |
| | | | | | 118/100 |

FOREIGN PATENT DOCUMENTS

| FR | 2 886 721 | A1 | 12/2006 |
| JP | S60-251390 | A | 12/1985 |
| WO | 98/33031 | A1 | 7/1998 |
| WO | 02/44639 | A1 | 6/2002 |

* cited by examiner

*Primary Examiner* — Sarang Afzali
(74) *Attorney, Agent, or Firm* — Collard & Roe, P.C.

(57) ABSTRACT

A method for producing a heat pipe includes the steps: providing a pipe-shaped casing element having a length and an interior; filling a powder with particles into the casing element to form a capillary structure in the casing element; connecting the particles of the powder to one another, wherein the interior enclosed by the casing element is filled with the powder partially or in its entirety at least across a partial area of the length of the casing element, and subsequently the connection of the particles of the powder to one another and preferably also to the casing element in a layer lying against the casing element is established from the outside by inductive heat generation.

5 Claims, 2 Drawing Sheets

METHOD FOR PRODUCING A HEAT PIPE

CROSS REFERENCE TO RELATED APPLICATIONS

Applicant claims priority under 35 U.S.C. § 119 of Austrian Application No. A50106/2020 filed Feb. 12, 2020, the disclosure of which is incorporated by reference.

BACKGROUND OF THE INVENTION

1. Field of the Invention

The invention relates to a method for producing a heat pipe comprising the steps: providing a pipe-shaped casing element having a length and an interior; filling a powder with particles into the casing element to form a capillary structure in the casing element; connecting the particles of the powder to one another.

The invention further relates to a heat pipe comprising a casing element and a capillary structure, made of a powder, which is surrounded by the casing element, and which is formed to be at least approximately annular in cross section and has a wall thickness.

2. Description of the Related Art

Heat pipes have been described in manifold ways in the prior art. In simple terms, a heat pipe is a self-contained system in a substantially pipe-shaped housing that has a fluid in its inside that is close to its boiling point at operating temperature due to the prevailing pressure. If the heat pipe is heated in a partial area, the fluid changes to the gaseous phase, to flow in the direction of a cooler area in the interior of the heat pipe, condense there and flow back into the warmer area along the inner walls of the housing of the heat pipe. In the course of this (heat) transport process, the heat pipe extracts heat from its surroundings in an evaporation area and supplies this heat to the surroundings of the condensation area of the heat pipe.

For transporting the liquid fluid from the condensation area into the evaporation area, capillary structures can be provided in such heat pipes. These can be generated using diverse means. Powders which are sintered onto the inner walls of the heat pipes are often used for this purpose.

To produce heat pipes that are just partly filled with a capillary structure, core rods are used, such that an annular space is formed between the pipe and the core rod which is then filled with the sintering powder. For example, WO 02/44639 A1 describes a method for producing a heat pipe comprising the steps: Positioning a tool in the middle of the pipe and multiple wires at a position of the pipe fixed on an inner wall; filling metal powder between the inner wall of the pipe and the tool; sintering the resulting structure in a furnace under a reducing atmosphere at a temperature for a predetermined time, removing the tool and the wires to form the capillary structure with continuous tube type air holes, and filling a working fluid inside the tube under vacuum and sealing the tube.

However, alternative manufacturing methods of heat pipes provided with sintering powders have been described as well. For example, WO 1998/033031 A1 describes a method for producing a heat pipe for transporting heat from an evaporation area to a condensation area, comprising a housing with housing walls, a capillary structure arranged in the housing and thermally coupled in the evaporation area and in the condensation area in each case to the corresponding housing wall, a vapor channel arranged in the housing and leading from the evaporation area to the condensation area, and a heat transport medium, wherein the capillary structure is produced as an open-pored capillary layer by thermal plasma spraying of powder particles.

SUMMARY OF THE INVENTION

It was the object of the present invention to create a possibility to produce a heat pipe in which the wall thickness of the capillary structure can be adjusted relatively easily and/or to create a corresponding heat pipe.

This object is achieved in the initially mentioned method in that the interior enclosed by the casing element is filled with the powder partially or in its entirety at least across a partial area of the length of the casing element, subsequently the connection of the particles of the powder to one another and preferably also to the casing element in a layer lying against the casing element is established from the outside by means of inductive heat generation, and subsequently any excess powder with loose particles is removed again from the casing element.

The object is further achieved by the initially mentioned heat pipe in which the capillary structure on the inner jacket surface has a surface roughness amounting to between 20% and 500% of the mean diameter of the particles of the powder.

The advantage of this is that a capillary structure having a relatively high porosity can be generated from the powder. Moreover, the necessity of using a core pin to form a hollow-cylindrical capillary structure can be dispensed with, which according facilitates its production. As a side effect, hence, the production time of such heat pipes can be shortened which also allows for a reduction of the production costs. By avoiding a core pin, it is also possible to prevent the capillary structure from unintentionally having a different layer thickness. If the core rod is inserted obliquely, or if a bent core pin is used, this results in annular spaces of different widths over the length of the casing element, so that the powder filling is also not uniform. Moreover, by preventing a core pin, an inner jacket surface of the hollow-cylindrical capillary structure is generated which is much rougher than surfaces lying against the core rods. A further advantage consists in that the length of the heat element that can be produced is not impacted by the length of a core rod, such that "endless" heat pipes can be produced.

For a capillary structure with a higher solidity, the capillary structure produced by the method can still be sintered. For this purpose, it can be provided according to an embodiment variant of the invention that the casing element provided with the capillary structure is subjected to a sintering process.

The method also offers the possibility that according to a further embodiment variant of the method, the capillary structure to be produced from the powder is produced having different layer thicknesses across the length of the capillary structure, such that in an embodiment variant of the heat pipe, the annular capillary structure comprises changing wall thicknesses across the length of the heat pipe. Hence, the capillary structure can be easily adapted to applications in which different amounts of heat are to be generated and removed locally.

According to an embodiment variant of the heat pipe, it can be provided in this regard that the capillary structure, across the length of the capillary structure and/or across the inner circumference of the capillary structure, comprises alternating thin and comparatively thicker sections, which allows for easier tempering of an object lying against the heat pipe. Hence, different surface structures, such as gouges, knobs, etc. can be provided.

A simple possibility for forming different wall thicknesses can be provided if, according to an embodiment variant of the method, the casing element provided with the powder is moved at different speeds through an inductor or the inductor is moved at different speeds along the casing element provided with the powder and/or is inductively treated at different frequencies.

It the course of the evaluation of the method that was carried out, it became apparent that it is advantageous for the formation of a firmly cohesive yet relatively highly porous structure if according to a further embodiment variant of the method a powder is used, which comprises particles having a diameter between 5 µm and 1000 µm, in particular between 5 µm and 500 µm.

As already mentioned, a capillary structure merely comprising just small deviations from the wall thickness across the length of the heat pipe can be generated by means of the method. Thus, in an embodiment variant of the heat pipe, the wall thickness of the capillary structure formed having an annular cross section can be formed across the entire length of the heat pipe so as to deviate from the mean wall thickness by a maximum of ±0.1 mm, in particular by a maximum of ±0.05 mm.

A further advantage of the method is that thus layer thicknesses of the capillary structure can be produced which cannot be produced using a core rod method, since the remaining annular space between the casing element and the core rod cannot or not entirely by filled with the powder. Thus, in an embodiment variant of the heat pipe it is provided that the wall thickness of the capillary structure formed having an annular cross section amounts to between 0.005 mm and 0.1 mm. Such thin layers are advantageous for example for very flat heat pipes e.g. for the use in smartphones, etc.

BRIEF DESCRIPTION OF THE DRAWINGS

For the purpose of better understanding of the invention, it will be elucidated in more detail by means of the figures below.

These show in a simplified schematic representation.

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
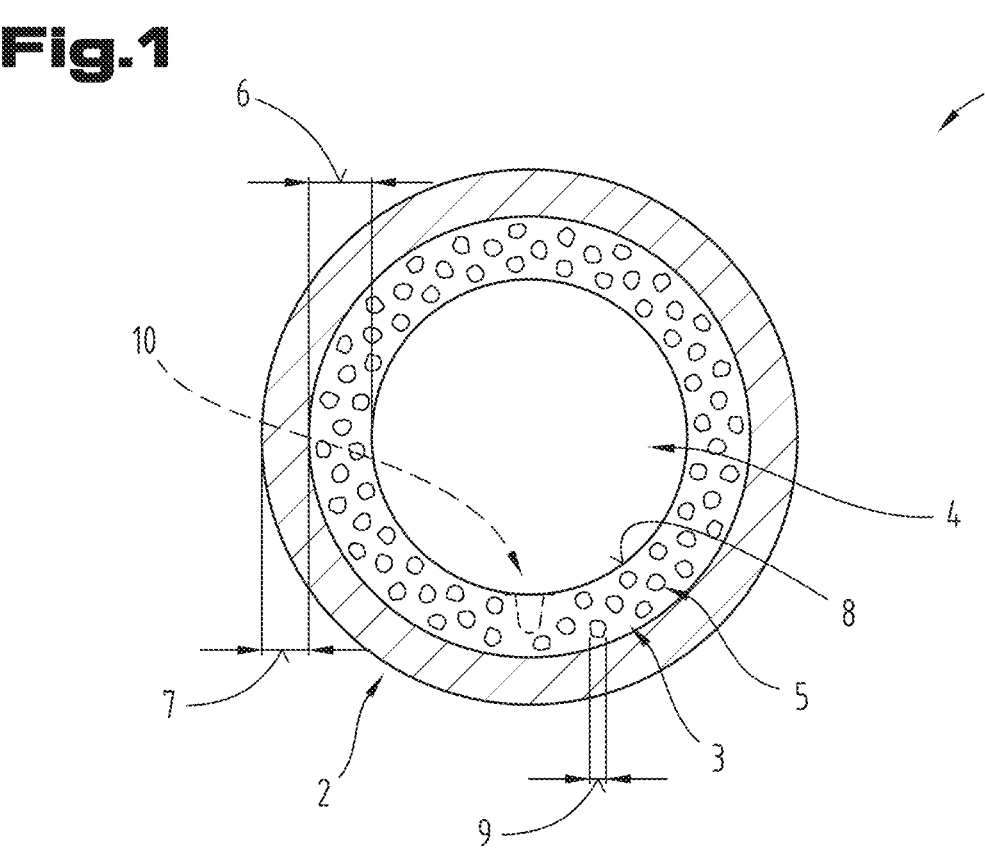
FIG. 1 a heat pipe in cross section.

FIG. 1 shows a cross section through a heat pipe 1.

The heat pipe 1 serves for cooling and/or tempering objects. It can be generally be used for heat transport, to transport heat energy from a first location to a second location. The functionality has already been briefly elucidated above.

The heat pipe 1 comprises a casing element 2 and a capillary structure 3 (which can also be referred to as capillary element) and/or consists of these components.

The casing element 2 is formed as a pipe. It can have diverse cross sections, such as circular, oval, polygonal, or square, rectangular, and so on. According, the shape of the heat pipe 1 and/or of the casing element 2 shown in the Figures is not to be understood in a limiting manner.

The casing element 2 consists of a metal material, Preferably, copper or a copper-based alloy is used because of its thermal conductivity. However, other metals or metal alloys, such as aluminum, silver, etc., can also be used. The used material also provided the heat pipe 1 with the dimensional stability in the temperature range used.

The casing element 2 defines an interior 4 which it encloses. The capillary structure 3 is arranged in this interior 4 and is accordingly also enclosed by the casing element 2.

The capillary structure 3 also consists of or comprises a metal material. Preferably, copper or a copper-based alloy, e.g. brass, is used because of its thermal conductivity. However, other metals or metal alloys can also be used, such as aluminum, aluminum alloys, noble metals, such as silver, platinum, iron, steel, e.g. stainless steel, hard metals, tungsten, chromium, nickel, nickel alloys, cobalt, titanium, magnesium, semi-metals, such as silicon, etc. However, the capillary structure can also consist of or comprise non-metal materials, such as carbon fibers or graphite. The capillary structure represents the capillaries for transporting the liquid working medium in the heat pipe 1.

Figure 2:
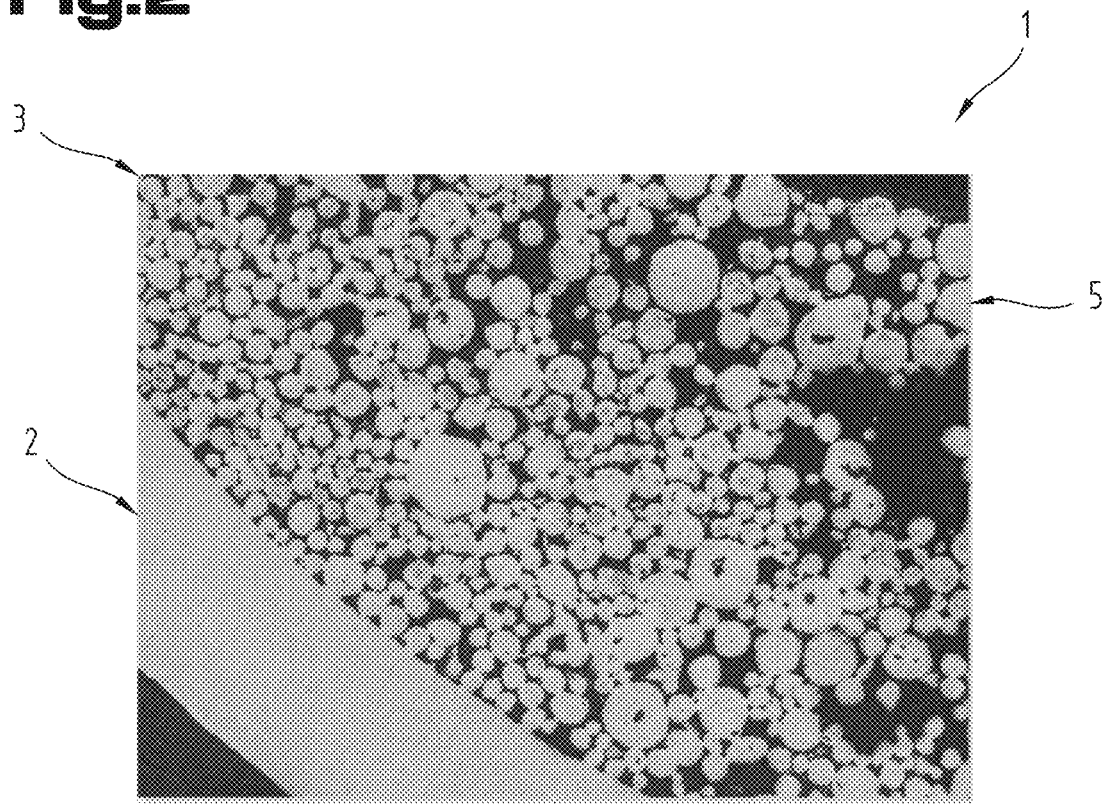
FIG. 2 a microscope image of a section of the heat pipe according to FIG. 1.

The capillary structure 3 comprises and/or consists of particles 5 of a powder, in particular of the aforementioned metal and/or non-metal materials. The particles 5 are connected to one another such that a porous structure is formed, as can for example be seen from FIG. 2 which shows a microscopic section of the heat pipe 1.

Preferably, the capillary structure 3 comprises a porosity according to DIN 30911-3 1990-10 of between 10% and 70%.

In the shown embodiment variant of the heat pipe 1, the capillary structure 3 is formed hollow-cylindrically. In this regard, the capillary structure 3 can have a wall thickness 6 which corresponds to between 1% and 1000% of a wall thickness 7 of the casing element 2.

In absolute values, the capillary structure 3 can have a wall thickness 6 that amounts to between 10 µm and the total internal cross section of the heat pipe 1.

According to an embodiment variant of the heat pipe 1, it can be provided that the wall thickness 6 of the hollow-cylindrical capillary structure 3 amounts to between 0.005 mm and 1 mm.

Further, the wall thickness 6 of the capillary structure 3 can have a value amounting to between 5 µm and 95% of the inner radius of the casing element 2 of the largest dimension of the cross section of the interior 4. In the shown embodiment variant of the heat pipe 1, this is the diameter of the interior 4. In flat heat pipes 1 the cross section of which has a width and a height, this is the width of the interior 4.

Further, the capillary structure 3 comprises an inner jacket surface 8, It can have a surface roughness amounting to between 20% and 500% of a mean diameter 9 of the particles 5 of the powder. The mean value of the particles 5 of the powder is determined microscopically by averaging dimensions from five measurement sections. The capillary structure 3 may thus have a relatively rough surface. In this context, gouges 10 or furrows or generally recesses may also be formed in the inner jacket surface 8, the width and/or depth of which is between 100% of the particle size of the particles 5 of the powder and 50% of the inner diameter of the casing element 2. The inner jacket surface 8 can thus also be structured at least partially, i.e. be provided with a surface structure, which is a result of the used powder and the production method. For example, the inner jacket surface 8 can be at least approximately knob-shaped in at least some areas.

It is also possible in the context of the invention that the surface roughness of the capillary structure 3 on the inner surface 8 is changed across the length of the casing element 2, i.e. a surface roughness varying across the length of the casing element 2 is given. It can for example be generated by using different powders which are filled into the casing element 2 one after the other. In the alternative or in addition to this, it can be provided that the energy input into the powder is varied during inductive heat generation. Hence, locations or sections in the heat pipe 1 having a different surface structure can be willfully generated.

Besides the surface roughness, the capillary structure 3 can be produced having a very uniform wall thickness 6 across a length 11 (see FIG. 3) of the capillary structure 3 in the direction of a longitudinal central axis 12 of the heat pipe 1. According to an embodiment variant of the heat pipe 1, the wall thickness 6 of the capillary structure 3 may deviate from the mean value of the wall thickness 6 across the entire length 11 of the capillary structure 3 by a maximum of ±0.1 mm, in particular by a maximum of ±0.05 mm. The mean value here refers to the arithmetic mean of all wall thickness values as viewed across the length 11.

Figure 3:
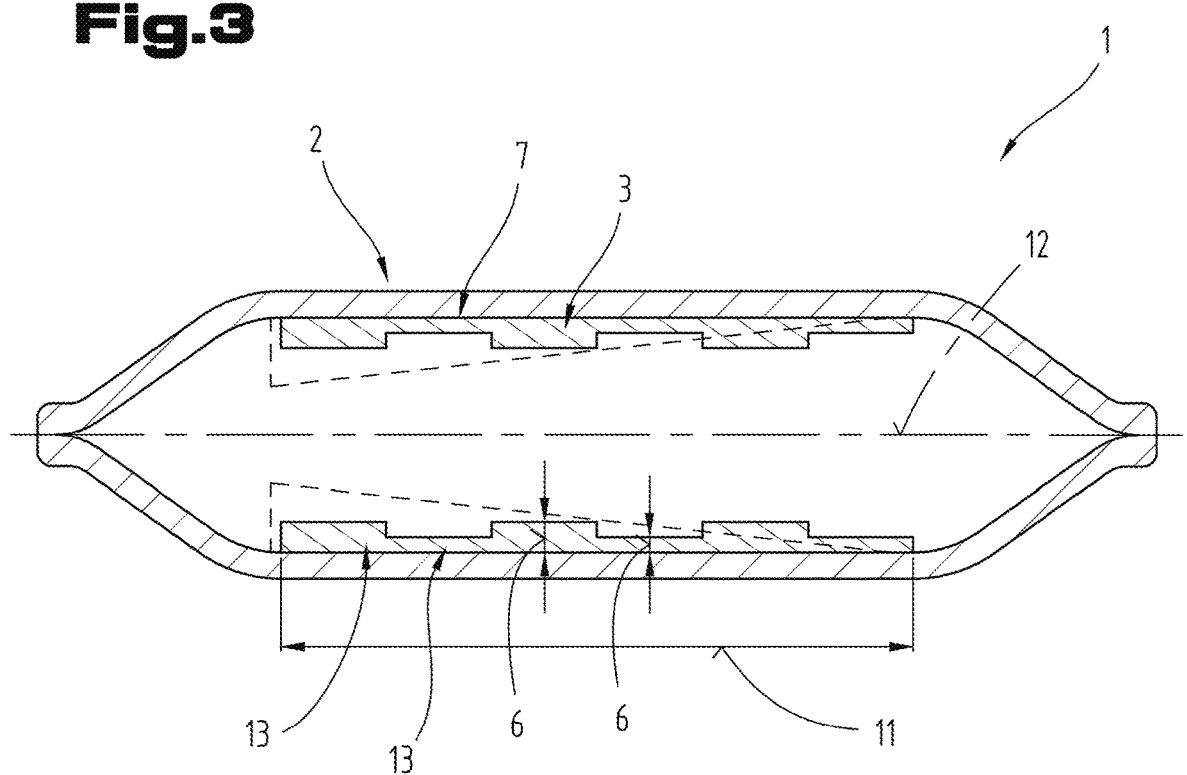
FIG. 3 a heat pipe in longitudinal section.

As is shown in FIG. 3, it can also be provided in the context of the invention according to a further embodiment variant that the capillary structure 3 comprises an alternating wall thickness 6 across the length 11 of the capillary structure 3 in the direction of the longitudinal central axis 12.

For example, according to a further embodiment variant, the capillary structure 3 may comprise alternating thin and comparatively thicker sections 13 across its length 11. However, other thickness distributions can be produced as well, for example with a continuous decrease in thickness across the length 11 as is shown in dashed lines in FIG. 3. However, the specifically illustrated wall thickness distributions of the capillary structure shall not be understood to limit the scope of the invention.

The particles 5 are connected to one another during the production of the capillary structure 3. In this context, it may also preferably be provided that the capillary structure 3 is connected to the casing element 2.

An already pipe-shaped casing element 2 is used for producing the heat pipe 1. As can be seen from FIG. 4, it is completely filled with the powder from which the capillary structure 3 is made, at least up to a length 16 of the casing element 2. The length 16 can be a part of the total length of the casing element 2. However, it is also possible to completely fill only a partial area of the casing element 2 with the powder, so that the length 16 is only a fraction of the total length of the casing element 2.

Filling of the casing element 2 with the powder can be carried out with the casing element 2 being stationary or turning (rotating). It is further possible that the casing element 2 is moved in another way during filling, for example shaken.

Moreover, it is possible that the casing element 2 is filled merely partially, is then set in rotation and subjected to inductive heating with continued rotation and appropriate feed. Hence, it is possible for example to work without excess powder which must be removed after inductive heating. This is therefore a type of centrifugal process in which at least approximately the exact amount of powder is used that is required to form a capillary structure 3 with an annular cross section. Due to the (constant) rotation, an at least approximately uniform, in particular a uniform, layer thickness of the capillary structure 3 can be produced.

Furthermore, it is possible that casing elements 2 are used which have a cross section that varies across their length and are for example formed having a "bottleneck".

Prior to filling in the powder, an end of the casing element 2 can be closed such that the powder does not immediately trickle back out of the interior 4 of the casing element 2. Preferably, the production of the capillary structure 3 is carried out in a vertically oriented casing element 2. In case of horizontal filling of the casing element 2, however, it is also possible to work with casing elements 2 open on both sides.

After the casing element 2 has been filled with the powder in the desired length, the particles 5 of the powder are connected to one another and preferably also to the casing element 2. The connection of the particles 5 to one another is established thermally. The required thermal energy is generated by means of an inductor 14 and is inductively fed into the powder from the outside. For this purpose, the inductor 14 is arranged on and spaced apart from an outer jacket surface 15 of the casing element 2. To form the capillary structure 3, the casing element 2 and the inductor 14 are moved relative to one another. Preferably, the inductor is moved upwards (or downwards, depending on the starting position) along the casing element 2. Especially in case of very long casing elements 2, the casing element 2 can also be moved through the inductor 14. However, the relative movement can also be carried out horizontally.

The inductor 14 can have an annular cross section. However, depending on the cross-sectional shape of the casing element 2, the inductor 14 can also have a different cross-sectional shape.

Figure 4:
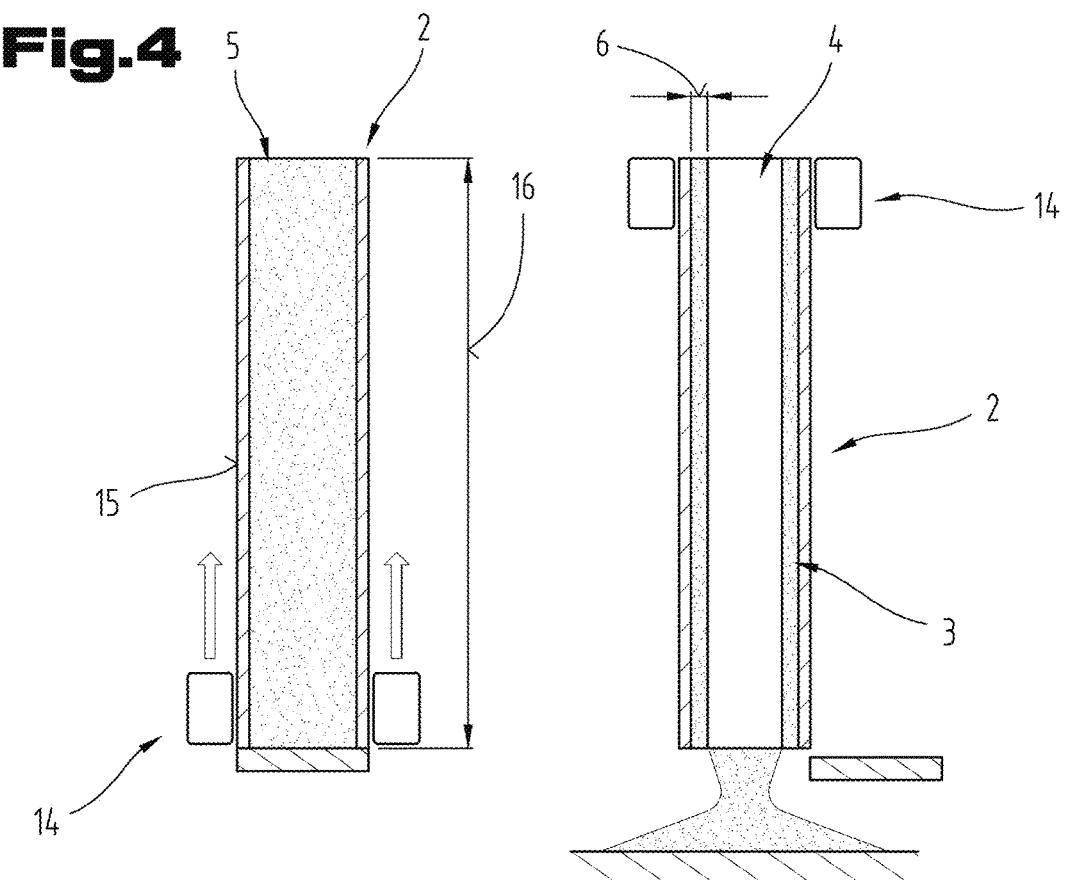
FIG. 4 a part of the course of the method for producing a heat pipe.

Due to the energy irradiation into the powder, the particles 5 of the powder are connected to one another. Depending on the duration and/or frequency, a more or less thick layer of connected particles 5 is thus formed, which rests against the casing element 2 and is preferably connected to it. With a correspondingly long treatment, the capillary structure 3 can therefore also fill the entire cross section. In the preferred embodiment variant of the heat pipe 1, the capillary structure 3 is, however, produced having an annular cross section, i.e. for example hollow-cylindrically. Thus, merely a marginal layer of particles 5 connected to one another is produced. After the induction treatment of the powder, the powder which is still loose is removed from the casing element 2, as is shown in FIG. 4 in the right part. For this purpose, for example the bottom closure of the casing element 2 can be removed such that the loose powder trickles out of the casing element 2. The marginal layer remaining in the casing element 2 forms the capillary structure 3.

The wall thickness 6 of the capillary structure 3 can be adjusted via the process parameters. For example, the following process parameters can be used:

Frequency: 150 Hz-400 Hz

Feed rate of the inductor 14 or the filled casing element 2: 50 mm/min-2500 mm/min Ambient temperature: 20° C.-50° C.

Active cooling: e.g. with a glycol/water mixture

Rotational frequency of the casing element 2 around its own axis: 100 RPM to 400 RPM.

For example, a larger wall thickness 6 of the capillary structure 3 can be produced by selecting a smaller feed rate of the inductor 14. Reversely, a thinner wall thickness 6 can be produced with higher feed rates.

The variation of the process parameters can also be used for generating the aforementioned different wall thicknesses 6 within one capillary structure 3. For example, a slower feed rate of the inductor 14 results in thicker sections and, reversely, a faster feed rate of the inductor 14 results in thinner sections within the capillary structure 3. Thus, for example, by a sequence of slower and comparatively faster feed rates, a capillary structure 3 with a sequence of thinner and comparatively thicker wall thicknesses 6 can be produced.

According to an embodiment variant of the method, it can be provided that the casing element 2 provided with the capillary structure 3 is additionally subjected to a sintering process. For this purpose, the casing element 2 equipped with the capillary structure 3 can be subjected to an increased temperature (the sintering temperature) for a certain period of time (e.g. between 10 minutes and 15 hours), for instance in a continuous furnace. In this regard, this temperature is governed by the used metal materials and can be between 300° C. and 1,500° C., Since sintering methods are per se known, a further explanation can be dispensed with at this point.

In the sintering furnace, a protective gas atmosphere or reducing atmosphere may prevail to prevent oxidation of the metals.

According to the preferred embodiment variant of the invention, a powder is used for the production of the capillary structure 3 which comprises particles 5 having a diameter of between 5 μm and 1000 μm.

According to a further embodiment variant it can be provided that a casing element 2 is used which is provided with a structuring on the surface facing the capillary structure 3. This surface structuring can for example be formed in the form of longitudinal gouges (in the direction of the longitudinal central axis 12). However, other surface structurings may also be provided. With this surface structuring, the directional flow of the liquid working fluid can be favored.

Merely for the sake of completeness, it should be noted that after the carried out production of the capillary structure 3, the heat pipe 1 is filled with the working medium and is sealed liquid-tight.

The exemplary embodiments show and/or describe possible embodiment variants, while it should be noted at this point that combinations of the individual embodiment variants are also possible.

Finally, as a matter of form, it should be noted that for ease of understanding of the structure of the heat pipe 1, it is not obligatorily depicted to scale.

LIST OF REFERENCE NUMBERS

1 heat pipe
2 casing element
3 capillary structure
4 interior
5 particle
6 wall thickness
7 wall thickness
8 inner jacket surface
9 diameter
10 gouge
11 length of capillary structure
12 longitudinal central axis
13 section
14 inductor
15 outer jacket surface
16 length of casing element

The invention claimed is:

1. A method for producing a heat pipe, the method comprising the steps:
   providing a pipe-shaped casing element having a length and an interior;
   filling a powder with particles into the interior of the casing element while feeding in thermal energy from the outside by inductive heat generation to connect the particles to one another and form a layer having a capillary structure formed from the particles of the powder and lying inside and against the casing element;
   wherein the interior enclosed by the casing element is filled with the powder in its entirety at least across a partial area of the length of the casing element; and
   removing any excess powder with loose particles from the casing element.

2. The method according to claim 1, wherein the capillary structure formed from the powder has different wall thicknesses across the length of the capillary structure.

3. The method according to claim 2,
   wherein the casing element provided with the powder is moved through an inductor at different speeds; or
   wherein the inductor is moved along the casing element provided with the powder at different speeds; or
   wherein the casing element provided with the powder is moved through the inductor at different speeds and is inductively treated at different frequencies; or
   wherein the inductor is moved along the casing element provided with the powder at different speeds and the casing element provided with the powder is inductively treated at different frequencies.

4. The method according to claim 1, wherein the casing element provided with the capillary structure is subjected to a sintering process.

5. The method according to claim 1, wherein the particles in the powder have a diameter of between 5 μm and 1000 μm.

* * * * *